Nov. 26, 1968  F. G. BROCKMAN  3,413,084
METHOD OF CONTROLLING THE ATMOSPHERE IN PREPARING FERRITES
Filed Oct. 24, 1965

INVENTOR.
FRANK G. BROCKMAN
BY
AGENT

United States Patent Office 3,413,084
Patented Nov. 26, 1968

3,413,084
METHOD OF CONTROLLING THE ATMOSPHERE
IN PREPARING FERRITES
Frank G. Brockman, Dobbs Ferry, N.Y., assignor to
North American Philips Company, Inc., New York,
N.Y., a corporation of Delaware
Filed Oct. 24, 1965, Ser. No. 504,902
3 Claims. (Cl. 23—51)

ABSTRACT OF THE DISCLOSURE

A method of regulating the oxygen content of a ferrite in which the ferrite is heated in a reaction zone in an atmosphere of $CO_2$ and $CO$, the ratio of the partial pressures of $CO_2$ and $CO$ in the atmosphere being automatically controlled by supplying the atmosphere from a reaction chamber in which $CO_2$ is passed over carbon (C) to form $CO$. The ratio $p_{CO}/p_{CO_2}$ is automatically controlled by regulating the temperature in the latter reaction vessel in response to the temperature in the reaction zone in which the ferrite is heated.

Figure 1:
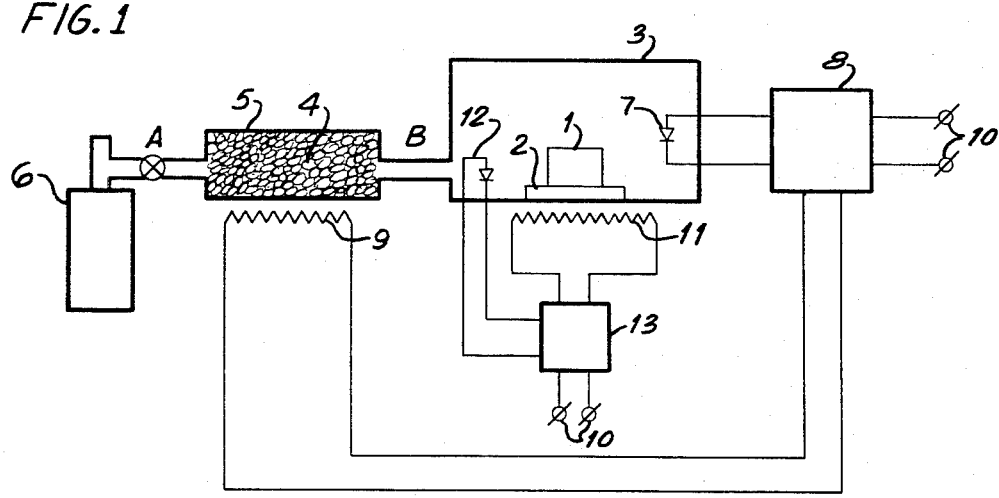

My invention relates to a method of regulating the oxygen content of a composition containing oxygen in combined form and which can release or absorb oxygen at elevated temperatures, particularly ferrites and to an apparatus for carrying out this method.

While the invention will be described in connection with the preparation of certain ferromagnetic ferrites, it should be understood that it is equally applicable to the preparation of other oxygen-sensitive compounds as well. As used throughout this specification and claims, a ferrite is understood to mean a composition corresponding to the formula $M^{+2}Fe_2^{+3}O_4$, M representing one or more divalent metals including $Fe^{+2}$, $Mn^{+2}$, $Zn^{+2}$, $Ni^{+2}$, and other divalent metals.

Ferrite magnetic materials are usually prepared by sintering operations at relative high temperatures (up to, say, 1500° C.). Certain of the ferrites are of such a chemical nature that this sintering operation must be carried out in appropriate atmospheres, differing from air. Examples of such ferrites are (1) manganese ferrite, (2) manganese-zinc ferrites, (3) magnetite (ferrous ferrite) and others. A pending patent application Ser. No. 312,687, filed Sept. 30, 1963, describes manganese-ferrous ferrites of various ratios of manganese ferrite to ferrous ferrite.

The appropriate atmospheres referred to above are the atmospheres which are in chemical equilibrium with the solid ferrites which are undergoing the sintering by heat. Ferrites are oxygen-containing compounds and the equilibrium atmosphere for any one ferrite composition is that atmosphere in which the amount of oxygen in the atmosphere is in equilibrium with the solid ferrite. This equilibrium depends upon the temperature of the ferrite composition and its surrounding gaseous atmosphere. At moderate temperatures, such as a few hundred degrees above room temperature, most ferrites are stable in air even if the percentage of oxygen in air is not the theoretically true equilibrium atmosphere. This is so because the rate of reaction of the solid ferrite with the surrounding atmosphere is negligibly small. The rates of reaction of many reactions increase rapidly with temperature, doubling (or even tripling) for a 10° C. rise in temperature.

This need for an equilibrium atmosphere during sintering arises chiefly from the chemical dissociation of ferric oxide at elevated temperatures. Thus:

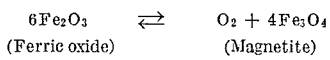

is one of the important reactions which ferric oxide undergoes. This equilibrium shifts toward the magnetite side at higher temperatures. This reaction may be said to occur because iron can exist in more than one valence state.

Magnetite is ferrous ferrite. Its formula may be written $Fe^{2+}(Fe_2^{3+}O_4)$ and so its relation to the ferrites in general can be gained from comparing this with the general formula often written for ferrites: $M^{2+}(Fe_2^{3+}O_4)$ where $M^{2+}$ is one of a number of divalent metal ions. Certain other ferrites exist which are of interest in this respect and the omission of these in this brief discussion should not be construed as eliminating them from the general applicability of this disclosure.

Another important oxide in ferrite technology is manganese oxide. Manganous ferrite, $Mn^{2+}(Fe^{3+}O_4)$, is a component in some of the most important commercial ferrite compositions. It is usually formed by the high temperature reaction which may be represented as:

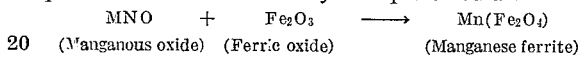

Manganese, similar to iron, is an element displaying more than one valance state. Manganous oxide enters into various reactions with oxygen, all being influenced by the percentage of oxygen in the atmosphere above the solid and by the temperature. Thus various manganese oxides are known: $MnO$, $Mn_3O_4$, $Mn_2O_3$, $MnO_2$.

The foregoing is intended to illustrate the need for controlled atmospheres in the preparation of certain ferrites. The fact that only the multivalent elements iron and manganese are mentioned does not preclude the application of the invention to ferrites of other elements and to structures different from $M^{2+}(Fe_2O_4)$.

At the present state of knowledge, it is not, in general, possible to state the equilibrium partial pressure of oxygen for a solid-gas equilibrium at any one temperature, and therefore as a function of temperature for a given reaction.

However, these equilibrium atmospheres can be determined experimentally for a given reaction. Thus, J. Smiltens, J. Chem. Phys., 20, 990–994 (1952), gives in his Table II, the composition of mixtures of carbon dioxide and carbon monoxide which yield the correct oxygen partial pressure over $Fe_3O_4$ from 400° C. to 1400° C. His Table II was derived by him from the work of Darken and Gurry, J. Am. Chem. Soc., 68, 798 (1946). Smiltens produced this gas mixture by mixing the separate gases in the correct ratios, changing the ratio as the temperature was changed.

G. Economos, J. Am. Ceramic Soc., 38, 241 (1955), has given similar data for manganous ferrite, $$Mn(Fe_2O_4)$$

The two examples given illustrate the fact that the necessary equilibrium atmosphere for a given material can be determined experimentally as a function of temperature.

It will thus be seen that in the firing of certain ferrites it is necessary to supply a special atmosphere. Furthermore, the composition of this atmosphere must be adjusted so that equilibrium conditions between the ferrite and the atmosphere are maintained throughout the temperature range of the firing (and, of course, the cooling cycle).

It is a principal object of my invention to provide a method of obtaining this equilibrium atmosphere in an automatic manner throughout the firing and cooling cycle.

It is another object of my invention to provide a suitable apparatus for carrying out this method of obtaining this equilibrium atmosphere.

Another object of my invention is to provide a method which avoids the dangers involved in the use of carbon monoxide by generating this gas as needed in a closed system.

These and further objects of the invention will appear as the specification progresses.

As noted by Smiltens and Economos (see above) appropriate equilibrium atmospheres can be made by mixing the correct amounts of carbon dioxide ($CO_2$) and carbon monoxide (CO). These two gases are in equilibrium with each other and with oxygen according to the chemical equation:

$$2CO_2 \rightleftharpoons 1CO + O_2$$

The equilibrium conditions for this reaction are known and, indeed, Smiltens used the known data to determine the ratios of $CO_2$ and CO required over $Fe_3O_4$ from 400° C. to 1400° C. As noted above, these mixtures were made manually.

In accordance with the invention the reaction between carbon dioxide ($CO_2$) gas and solid carbon (C) is employed to produce carbon monoxide (CO). This reaction proceeds according to the equilibrium equation:

$$CO_2 \text{ (gas)} + C \text{ (solid)} \rightleftharpoons 2CO \text{ (gas)}$$

This equilibrium is expressed:

$$K_p = (p_{CO})^2 / p_{CO_2}$$

where:

$K_p$ is the equilibrium constant
$p_{CO}$ is the partial pressure of CO at equilibrium
$p_{CO_2}$ is the partial pressure of $CO_2$ at equilibrium.

The equilibrium constant, $K_p$, varies with the temperature of the reaction. The equilibrium constants of this reaction for various temperatures have been determined (Louis S. Kassel, J. Am. Chem. Soc. 56, 1838–1942 (1934)). Using these data it is possible to calculate the ratios of the partial pressures of CO to the partial pressures of $CO_2$ for various temperatures of the reaction.

Thus for the firing (and cooling) of magnetite the following table can be prepared:

TABLE I.—TEMPERATURES OF $CO_2 + C \rightleftharpoons 2CO$ REACTION REQUIRED TO SUPPLY THE NECESSARY RATIOS OF CO and $CO_2$ FOR EQUILIBRIUM FIRING AND COOLING OF MAGNETITE

| Magnetite [1] | | Temperature of $CO_2+C \rightleftharpoons 2CO$ Reaction to Yield Corresponding $p_{CO}/p_{CO_2}$, ° C. |
|---|---|---|
| Temp., ° C. | Equilibrium Ratio $p_{CO}/p_{CO_2}$ | |
| 1,400 | 0.0101 | 405 |
| 1,300 | 0.0142 | 420 |
| 1,200 | 0.0204 | 435 |
| 1,100 | 0.0246 | 445 |
| 1,000 | 0.0331 | 460 |
| 900 | 0.0504 | 480 |
| 800 | 0.0662 | 490 |
| 700 | 0.100 | 510 |
| 600 | 0.123 | 525 |
| 500 | 0.163 | 540 |
| 400 | 0.250 | 565 |

[1] From Smiltens, l.c.

In order to apply the procedure described here it is necessary to have, in addition to the gas tight furnace for the firing (and cooling) of the ferrite in question, a saparate reaction vessel charged with carbon through which carbon dioxide can flow in intimate contact with the carbon. This reaction vessel must be provided with a heating system so that the reacting system $CO_2 + C \rightleftharpoons 2CO$ can be heated to the desired temperatures (in the case shown in Table I, from about 400° C. to about 600° C.). Thus, carbon dioxide is fed into this reactor charged with carbon, the reaction there produces the desired ratio of carbon monoxide to carbon dioxide as determined by the temperature of the reaction. This appropriate carbon monoxide and carbon dioxide mixture is then conveyed to the gas tight furnace in which the ferrite is being heated and cooled.

Figure 2:
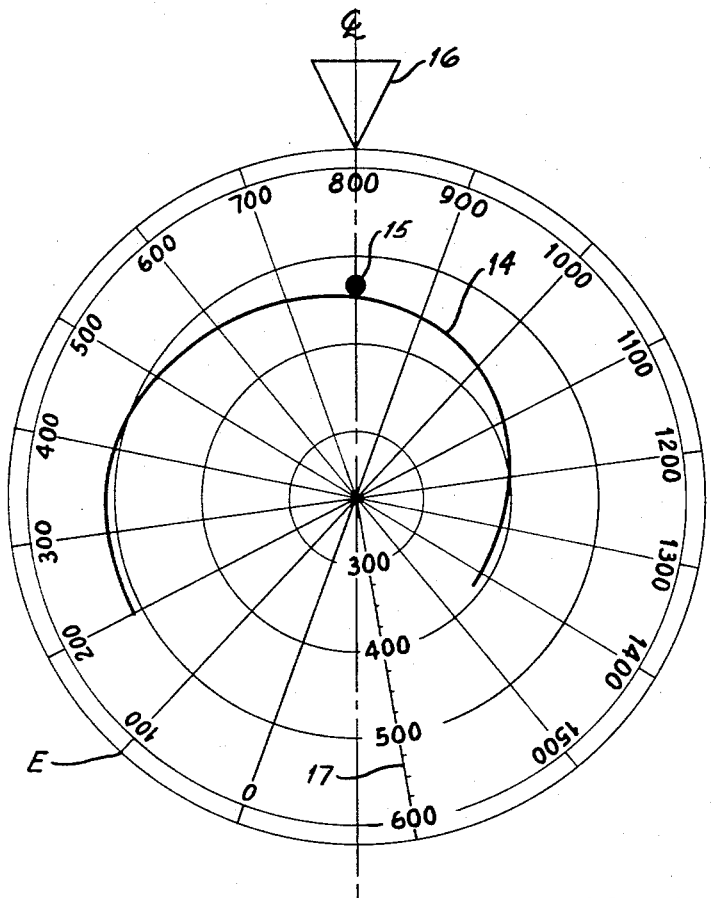

The invention will be described with reference to the accompanying drawing in which FIG. 1 shows diagrammatically an apparatus for carrying out the method according to the invention. FIG. 2 shows diagrammatically a temperature controller for use in connection with the apparatus as shown in FIG. 1.

Referring to FIG. 1, a body of oxidic material in which the ratio of the metallic ions is that of manganese ferrite ($MnFe_2O_4$) is placed on a support 2 within an airtight furnace 3 which is heated to temperatures from room temperature to about 1300° C., the atmosphere within the furnace 3 being a mixture of carbon dioxide ($CO_2$), and carbon monoxide (CO), which is formed by heating a mass of carbon granules 4 in a furnace 5 to temperatures betwen room temperature and 600° C., these temperatures being controlled as described hereinbelow. Carbon dioxide is introduced at A into furnace 5 from a source 6 which may be a flask of carbon dioxide, or other source. In order to control the reaction in the furnace 5 to provide a proper ratio of $CO_2$ to CO to furnace 3 through B in accordance with the reaction: $CO_2 + C \rightleftharpoons 2CO$, a thermocouple 7 in furnace 3 measures the temperature of the ferrite mass which actuates a temperature-indicator 8, temperature-indicator 8 is provided with a cam as described in FIG. 2. Furnace 5 is provided with a heating element 9 which is connected to the source of electrical power 10 through the temperature-indicator 8. Thus the ratio of the carbon dioxide to carbon monoxide will be determined by the temperature in the furnace 3, since temperature-indicator 8 will regulate the amount of current supplied to heater 9 thereby controlling the temperature in furnace 5 and thus regulating the reaction equilibrium between the carbon dioxide atmosphere in furnace 5 and the carbon. The partial pressures of carbon dioxide and carbon monoxide over the ferrite mass 1 will then be such that there is an oxygen equilibrium between the atmosphere and the ferrite mass. Heater 11, thermocouple 12 and temperature-controller 13 are used in a well-known manner to control the temperature of furnace 3, the power for the heater being supplied by the source of electrical power 10.

The temperature-controller 13 is shown in greater detail in FIG. 2, and comprises a cam 14 on which a roller 15 rides. The temperature within furnace 3 is shown by an indicator 16 and the rotation of the cam is proportional to the temperature in furnace 3. The temperatures within the furnace 5 are shown radially along the line 17 which represents the distances from the center of rotation of the cam. In the position shown the temperature within the furnace 3 is 800° C. and furnace 5 is controlled at approximately 450° C.

The shape of the cam is determined from the two calibrations of the indicator-controller. The one calibration is the angular rotation measuring the temperature of the gas in furnace 3 in which the ferrite is being heated (or cooled). The other calibration is the radial distance from the center corresponding to the position of the cam rider 15 for the temperature control of the reaction in furnace 5.

Furnace 3 is provided with a pressure release valve which permits the release of the excess pressure of CO and $CO_2$ but prevents the entrance of air from the outside.

The heaters 9 and 11 are shown as being supplied with electrical energy, but the source of energy may be other than electrical (e.g. gas), the only requirements are that the heaters do not contaminate the atmospheres in 3 and 5 and that the source of energy to the heaters 9 and 11 is capable of being controlled by 8 and 13.

If the temperature indicator has a scale which departs from the above proportionality between angular rotation and temperature, this is of no consequence since the appropriate scale of the indicator can be used to fix the radii for each chosen temperature.

Table II is a table similar to Table I, but indicates the temperatures and equilibrium ratios for the controlled atmosphere firing of manganese ferrite.

TABLE II.—TEMPERATURES OF $CO_2+C \rightleftharpoons 2CO$ REACTION REQUIRED TO SUPPLY THE NECESSARY RATIOS OF CO AND $CO_2$ FOR EQUILIBRIUM FIRING OF MANGANESE FERRITE

| Manganese Ferrite [1] | | Temperature of $CO_2+C \rightleftharpoons 2CO$ Reaction to Yield Corresponding $p_{CO}/p_{CO_2}$, °C. |
|---|---|---|
| Temp., °C. | Equilibrium Ratio $p_{CO}/p_{CO_2}$ | |
| 1,200 | 7.6×10⁻³ | 395 |
| 1,100 | 1.0×10⁻² | 405 |
| 1,000 | 1.4×10⁻² | 420 |
| 900 | 1.7×10⁻² | 430 |
| 800 | 2.3×10⁻² | 440 |
| 700 | 3.0×10⁻² | 450 |
| 600 | 4.0×10⁻² | 470 |
| 500 | 5.2×10⁻² | 485 |
| 400 | 7.0×10⁻² | 500 |

[1] From Economos, l.c.

It may be observed that carbon is consumed in the reaction occurring in furnace 5 so that from time to time it must be replenished. This may be done either by introducing a supply of carbon from time to time or by continuously introducing the carbon into furnace 5 in a manner well known to those skilled in the art.

In order that the equilibrium of the $CO_2+C \rightleftharpoons 2CO$ reaction is established rapidly at lower temperatures, a catalyst such as iron, nickel or cobalt may be used.

Finally it should be observed that the rate at which the temperature of the $CO_2+C \rightleftharpoons 2CO$ reaction in furnace 5 changes temperatures must be faster than the rate at which the furnace 3 changes temperature. This is necessary so that the atmosphere appropriate to a given ferrite temperature is always available.

While I have described the invention in connection with specific examples and applications thereof, it will be apparent to those skilled in the art that other modifications can be made without departing from the spirit and scope of the invention as defined in the appended claims.

What I claim is:

1. A method of regulating the oxygen content of an oxygen sensitive ferromagnetic ferrite comprising the steps of forming a mixture of CO and $CO_2$ by reacting C and $CO_2$ in a closed vessel at a temperature between 300° C. and 600° C., introducing the so-formed mixture of CO and $CO_2$ into a reaction zone where the ferrite is maintained at a given temperature, and automatically controlling the partial pressures of CO and $CO_2$ in response to said given temperature in the reaction zone by varying the temperature in the vessel in which C and $CO_2$ are reacting to correspond to an equilibrium pressure of oxygen over the ferrite at which the ferrite contains the desired amount of oxygen.

2. A method of regulating the oxygen content of $Fe_3O_4$ comprising the steps of forming a mixture of CO and $CO_2$ by reacting C and $CO_2$ in a closed vessel at a temperature between 300° C. and 600° C., introducing the so-formed mixture of CO and $CO_2$ into a reaction zone where the $Fe_3O_4$ is maintained at a given temperature, and automatically controlling the partial pressures of CO and $CO_2$ in response to said given temperature in the reaction zone by varying the temperature in the vessel in which C and $CO_2$ are reacting to correspond to an equilibrium pressure of oxygen over the $Fe_3O_4$ at which the $Fe_3O_4$ contains the desired amount of oxygen.

3. A method of regulating the oxygen content of manganese ferrite comprising the steps of forming a mixture of CO and $CO_2$ by reacting C and $CO_2$ in a closed vessel at a temperature between 300° C. and 600° C., introducing the so-formed mixture of CO and $CO_2$ into a reaction zone where the manganese ferrite is maintained at a given temperature, and automatically controlling the partial pressures of CO and $CO_2$ in response to said given temperature in the reaction zone by varying the temperature in the vessel in which C and $CO_2$ are reacting to correspond to an equilibrium pressure of oxygen over the manganese ferrite at which the manganese ferrite contains the desired amount of oxygen.

References Cited

Darken et al.: "Journal of American Chemical Soc.," vol. 67, 1945, pp. 1398–1412 (pp. 1398–1406 of interest).

Economos: "Journal of The American Ceramic Soc.," vol. 38, July 1955, pp. 241–244.

Smiltens: "Journal of Chemical Physics," vol. 20, June 1952, pp. 990–994.

EARL C. THOMAS, *Primary Examiner.*

HERBERT T. CARTER, *Assistant Examiner.*

UNITED STATES PATENT OFFICE
CERTIFICATE OF CORRECTION

Patent No. 3,413,084                      November 26, 1968

Frank G. Brockman

It is certified that error appears in the above identified patent and that said Letters Patent are hereby corrected as shown below:

Column 3, line 9, the equation should appear as shown below:

$$2CO_2 \rightleftharpoons 2CO + O_2$$

same column 3, line 60, "sapa-" should read -- sepa- --.

Signed and sealed this 10th day of March 1970.

(SEAL)
Attest:

Edward M. Fletcher, Jr.                      WILLIAM E. SCHUYLER, JR.
Attesting Officer                                      Commissioner of Patents